United States Patent
von Mueller et al.

(10) Patent No.: US 6,830,183 B2
(45) Date of Patent: Dec. 14, 2004

(54) DEVICE FOR SECURE READ, WRITE AND READ/MODIFY/WRITE OPERATION WITH DIVIDED TRACK TRANSDUCER HEAD

(75) Inventors: Clay von Mueller, San Diego, CA (US); Robert J. Mos, San Diego, CA (US)

(73) Assignee: Semtek Innovative Solutions, Inc., San Diego, CA (US)

( * ) Notice: Subject to any disclaimer, the term of this patent is extended or adjusted under 35 U.S.C. 154(b) by 0 days.

(21) Appl. No.: 10/427,860

(22) Filed: May 1, 2003

(65) Prior Publication Data

US 2004/0217169 A1 Nov. 4, 2004

(51) Int. Cl.[7] .................................................. G06K 7/08
(52) U.S. Cl. ....................................... 235/449; 235/493
(58) Field of Search ................................ 235/449, 487, 235/493; 360/113, 124

(56) References Cited

U.S. PATENT DOCUMENTS

| | | | | |
|---|---|---|---|---|
| 5,424,523 A | * | 6/1995 | Ohno et al. ................. | 235/449 |
| 5,780,828 A | * | 7/1998 | Mos et al. .................. | 235/449 |
| 6,038,108 A | * | 3/2000 | Dee et al. ................... | 360/121 |
| 6,042,014 A | * | 3/2000 | Zanetti ....................... | 235/493 |

* cited by examiner

*Primary Examiner*—Daniel Stcyr
(74) *Attorney, Agent, or Firm*—Richard D. Clarke

(57) ABSTRACT

A method and apparatus for placing and later determining the distance between transitions from a first logical state to a second logical state stored on a medium, for example, a document. This determination is used to precisely characterize the information pattern in order to authenticate the information and the medium on which the information is stored. The invention uses a reader having a leading and trailing read apparatus, which allow information to be read simultaneously from two or more locations spaced a known distance apart. The distance between the center lines of each read apparatus is preferably an odd integer multiple of one half the distance between logical clock transitions. The distance between a first transition at the leading read apparatus and a next transition at the trailing read apparatus is used as a reference, hence given the term the "Reference Value". The Reference Value is compared with the distance between the first transition and a second transition on the medium. Detection of deviations in spacing between transitions is unaffected by variations if the velocity of the medium with respect to the reader. Thus, the present invention is a method and apparatus for reading and writing conventional ISO 7816 data with additional precisely placed pulses that appear as noise to conventional reading apparatuses and as data to the described invention. In addition the present invention applies to a medium, which moves at an uncontrolled velocity relative to a read/write apparatus with which the data is read and written.

31 Claims, 14 Drawing Sheets

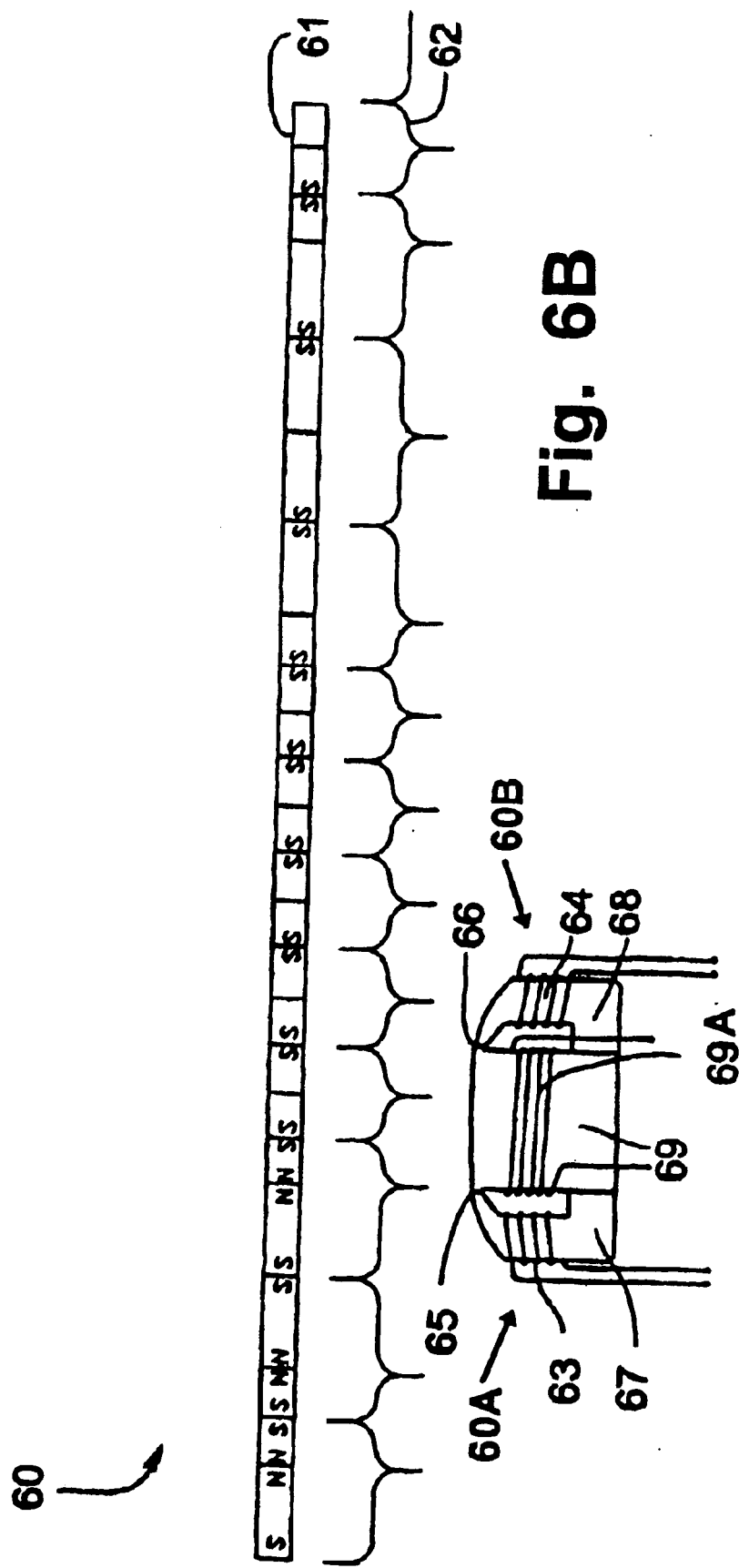

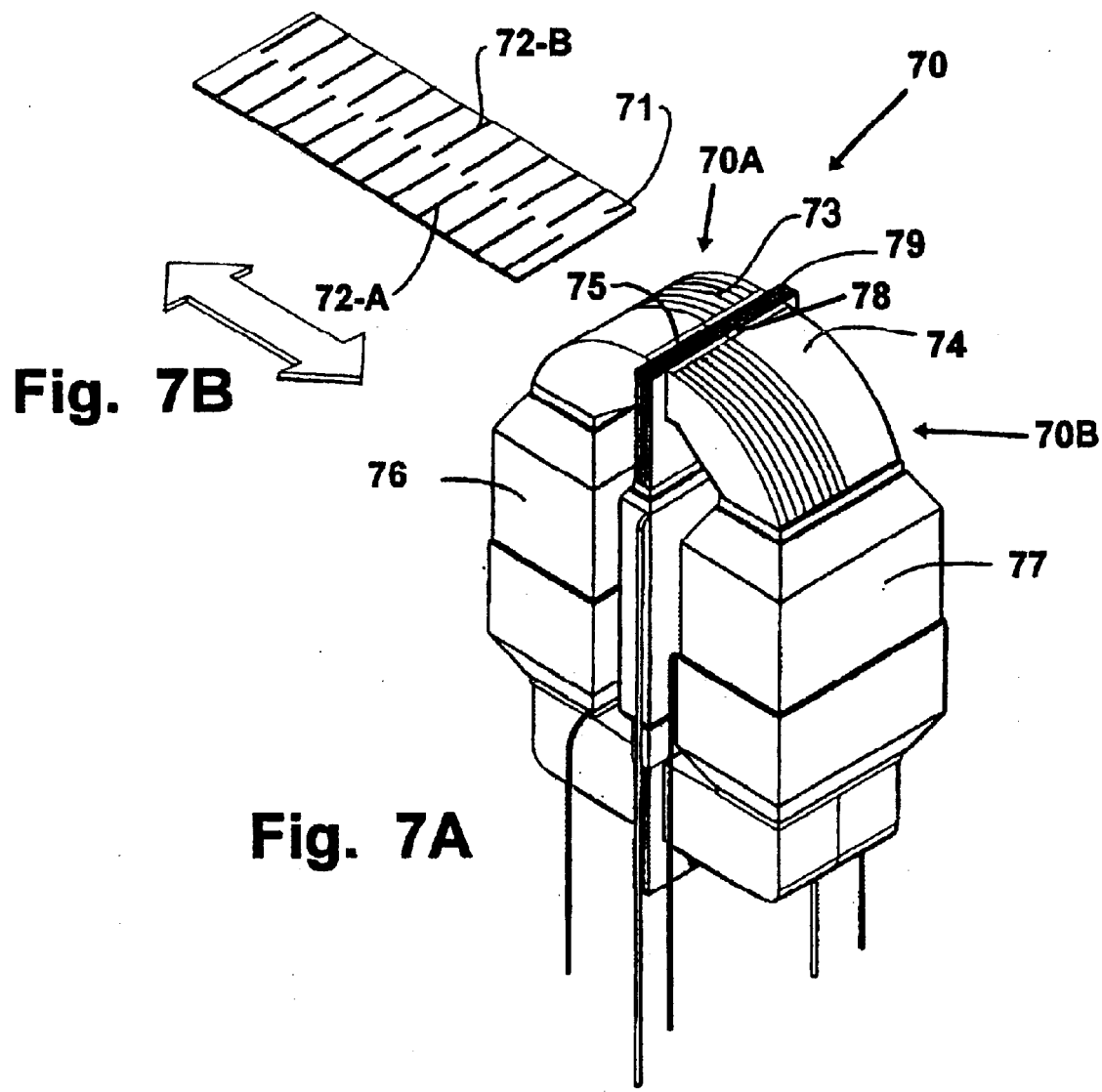

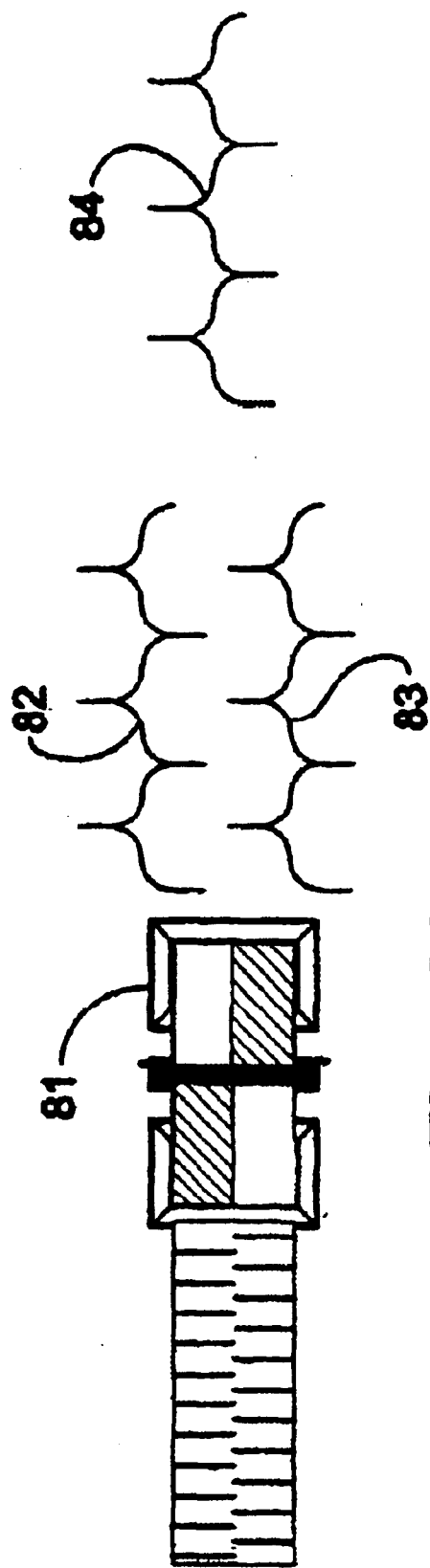
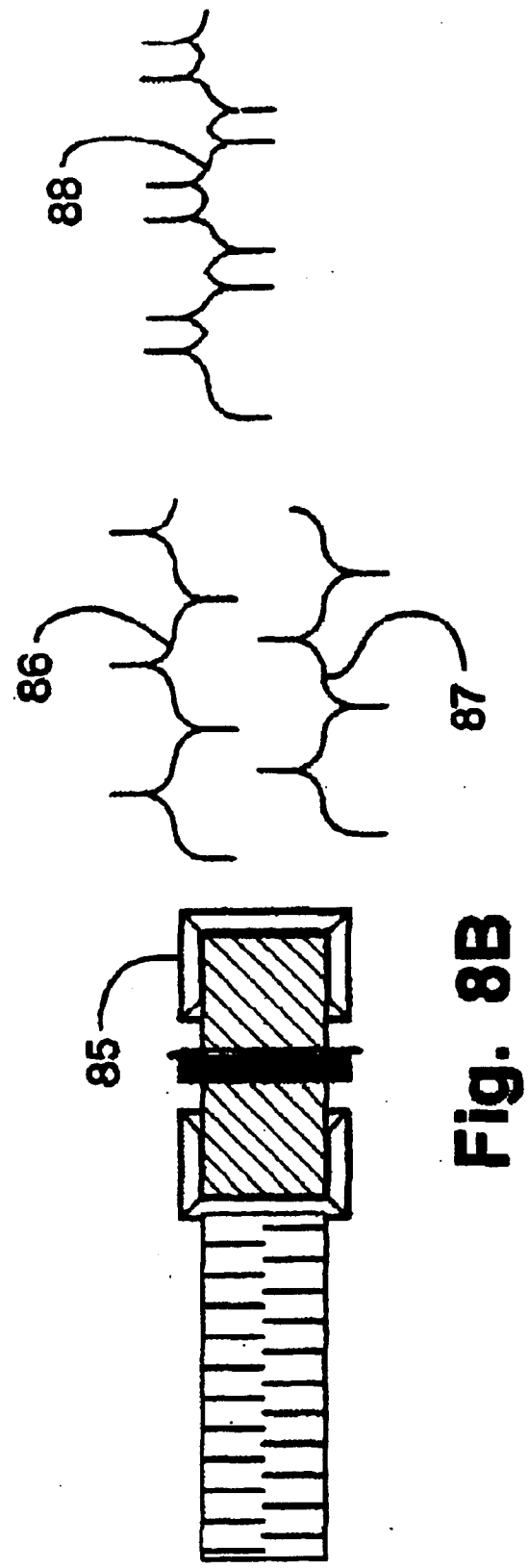
Fig. 8A
Fig. 8B

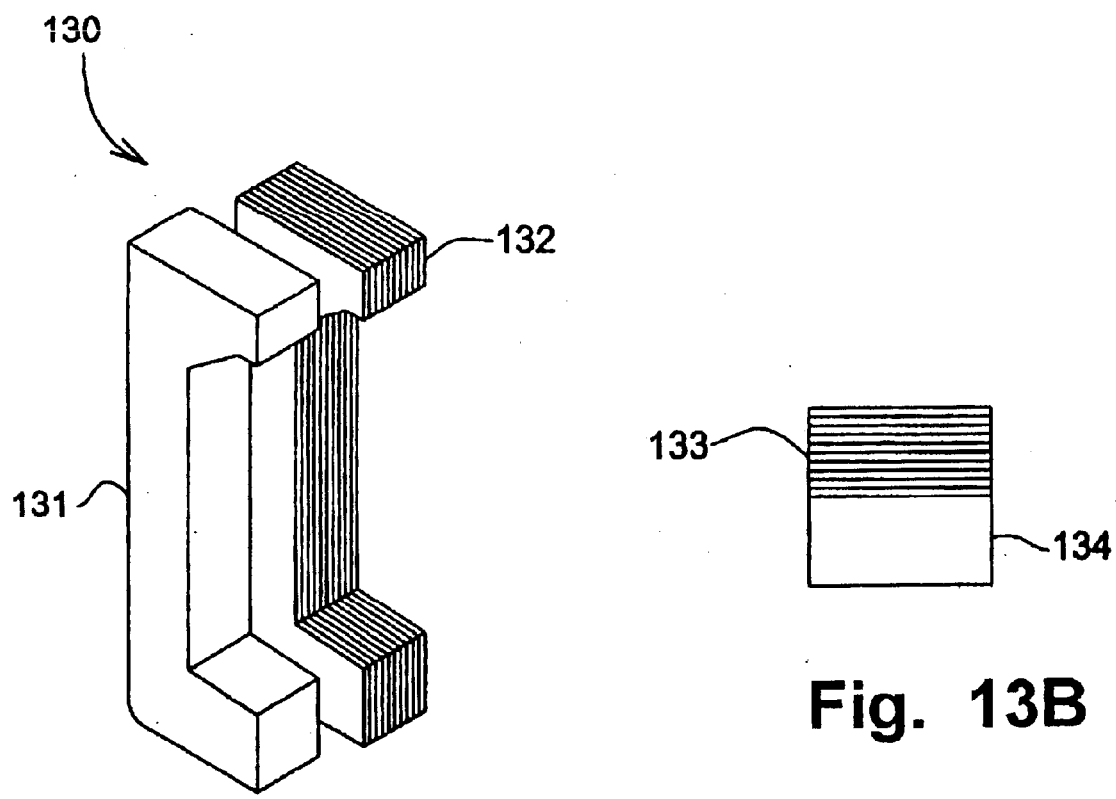
Fig. 13A
Fig. 13B
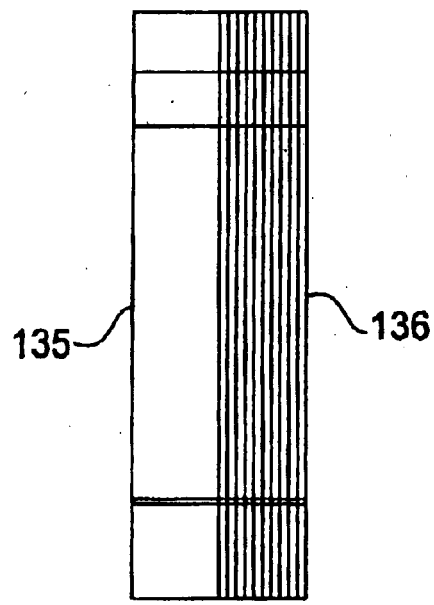
Fig. 13C

DEVICE FOR SECURE READ, WRITE AND READ/MODIFY/WRITE OPERATION WITH DIVIDED TRACK TRANSDUCER HEAD

BACKGROUND OF THE INVENTION

1. Field of the Invention

The present invention relates to a new and improved device for reading, modifying and writing information on a storage medium, and more particularly to a method and apparatus for authenticating the medium and information stored on the medium by performing spatial measurements using a divided track transducer head.

2. Description of the Related Art

In many instances, it is desirable to provide a method and apparatus for storing and transporting information. In particular, many ways have been devised for encoding information on a medium which can be conveniently carried about by a person during the normal course of business. For example, credit cards, debit cards, electronic purse cards, decrementing value cards, checks, driver's licenses, identification cards, access control cards, magnetic tapes and disc, and many other such media which are small enough to be conveniently carried in a person's handbag or wallet are ubiquitous today. However, in many of the applications in which these media are intended to be used, security is an important concern. That is, it is important that only authorized organizations are capable of modifying the information stored thereon. One very common way for information to be stored on such a medium is by magnetically encoding the information.

Techniques for encoding information on magnetic media have been available for many years and are now relatively inexpensive. Other techniques include optical storage techniques and printed information using relative light and dark areas, such as the uniform purchasing codes (UPCs) which are printed on the packaging of most products today. For simplicity sake, only magnetic techniques are discussed in detail. However, it will be understood that the following discussion applies equally well to other techniques for storing information.

Cards which have a magnetic stripe attached thereto are ubiquitous in modem society. That is, nearly everyone carries one of the following cards, each of which typically has a magnetic stripe attached thereto: credit cards, bank cards (ATM cards), debit cards, identification cards, driver's licenses, security access cards, check cashing cards, etc. Data is typically represented on magnetic medium by polarizing magnetic particles of the magnetic medium in one of two magnetic states. When magnetic medium is swiped across an inductive read head the moving magnetic field induces a magnetic field in the head core structure which in turn induces an electric current in the head read coil.

Alternately the change in magnetic field states can be directly measured using a magnastritive (MR) head. Either voltage waveform is converted to pulses with a peak detector. When reading the data from the magnetic medium, transitions between the two magnetic field states induce a voltage in the magnetic head read coil. A peak detector circuit translates this voltage into binary states. The head coil voltage is amplified by a differential amplifier then a dual edge peak detector switches between ground and VCC states each time the input changes polarity. The output of the peak detector is buffered by comparator with hysteresis to improve noise immunity. The states generated are detected as pulse durations; one pulse duration is approximately double in length to the other. The longer pulse duration represents a bit cell time and data value of zero, two consecutive pulse of the shorter duration also represent bit cell and in this case a data bit value of one.

Magnetically encoded information can easily be copied or transferred from one magnetic information storage medium to another. Unless special provisions are made to secure the information, information can be altered and re-encoded back onto the original medium or a duplicate of the original medium. If the information is used in a system for organizing financial transactions or for personal identification, then such copying, altering, and duplicating makes the person for whom the information was intended, and the organization who operates the system, vulnerable to fraud.

For example, if a magnetic stripe affixed to a debit card is used to indicate how much money is currently in a personal account, modifications to that information can be used to increase the apparent balance in order to purchase goods which have a higher value than actually exists in the account. Additionally, if the card is duplicated, the same account could be used by more than one person. It should be clear that fraud could occur in a number of ways if sensitive information is not properly secured. In fact fraud due to copying and modification of information magnetically encoded on portable media, such as magnetic stripe cards, is growing at an alarming rate. For example, it is estimated that the cost of fraud to the credit card industry alone will exceed one billion dollars per year before the end of the century.

A number of techniques have been proposed to authenticate both the information, and the medium on which the information is stored (commonly referred to as a "document"), in order to prevent fraud. For example, U.S. Pat. No. 4,023,204 issued to Lee, discloses using a unique magnetic coating with pre-determined alignment of the magnetic particles as the basis for authentication measurements. Thus, a code which can not be altered can be implanted into the document to authenticate the document. U.S. Pat. No. 5,336,871 issued to Colgate, discloses the use of a hologram to authenticate a substrate on which a magnetic stripe is affixed. U.S. Pat. No. 5,354,097 issued to Tel, discloses the use of overlays to authenticate information.

U.S. Pat. No. 4,628,195, issued to Baus, discloses generating a security code number determined by the relative spatial positions of corresponding data in two different forms of encoded data on a card. In particular, Baus discloses using a conventional magnetic stripe as the first means for encoding data, and using embossed characters as a second means for encoding data. The relative position of the magnetic information with respect to the embossed information is used ti) generate a numeric security code. In addition, dyes or absorbers incorporated in a magnetic stripe have been used to attempt to encode a security identifier into the document on which the information resides.

However, each of these methods requires the use of special materials in the security process. Accordingly, none of the old documents would be usable, and all of the documents currently in use would have to he recalled and reissued using the new security process. Recalling and replacing all of the documents that are currently in use would be very costly and has hampered the widespread implementation of such technologies.

In the case of the technique disclosed by Baus, both an automatic reading method for reading the magnetic stripe, and also an automatic reading method for reading the embossed characters, are required. Therefore, there are two sub-systems required by this technique. Furthermore, readers used at the point-of-sale must preserve the spatial relationship between the magnetically stored information and the embossed characters. This is a cumbersome and expensive process which is very difficult to perform at the point-of-sale. Accordingly, it may be difficult to maintain reliable operation of systems which conform to the Baus technique.

Others have attempted to overcome the above limitations when the document is a magnetic medium by employing characteristics of the magnetic signals used to store the information to authenticate both the document and the information stored thereon. For example, U.S. Pat. No. 4,837,426 issued to Pease, discloses a method for authenticating documents by analyzing the amplitude of the magnetic signals. U.S. Pat. Nos. 5,408,505 and 5,428,683, each issued to Indeck, et al. disclose a method for authenticating documents using "noise" in the saturation region of the magnetic data. U.S. Pat. Nos. 5,235,166, and 5,430,279, each issued to Fernandez, and U.S. Pat. No. 5,254,843 issued to Hynes, each disclose a method of authenticating documents by deriving inherent temporal measurements of timing variations of the data in the reading process.

All of the above mentioned methods for authenticating documents and information using characteristics of the magnetic signals have a common drawback in that variations in the motion of the document through the reading device cause variations in the characteristics used to authenticate the document, and therefore, result in errors in the authentication process. Furthermore, degradation of the reading device and the document over time due to natural wear causes the characteristics to either change, or to appear to change, causing further errors in the authentication process.

Accordingly, it would be desirable to provide a system which: (1) is capable of authenticating documents and the information stored thereon without use of a new material or process for generating the document to be authenticated; (2) is unaffected by changes in the speed at which the document moves with respect to the reader; and (3) will remain reliable over time.

In addition to the problems associated with authenticating documents and the information that is stored thereon, there is a need for methods for increasing the amount of information that can be stored on a document. For example, a magnetic stripe of a credit card is a relatively small area on which information can be stored. Accordingly, it would be advantageous to provide a method land apparatus which increases the amount of information that can be stored on a document.

Still further, in order to maintain standards for writing information on documents, it would be advantageous to be able to accurately determine the absolute distance between a transition in the information stored on a document from a first logical state to a second logical state without the need to control the velocity of the reader with respect to the document. The conventional method to accomplish this is with a precision peak detector which optimizes the peak detecting capabilities of conventional peak detector and using a constant speed drive transport.

Another method to accomplish this, as described in U.S. Pat. No. 5,770,846 issued to Mos et al., is with the use of a multiple gap magnetic head which detects adjacent bit transitions simultaneously. This method removes the requirement of a constant speed transport and still requires the use of precision peak detectors.

A new method of determining the placement of the data transitions without a peak detector is by measuring the frequency components of each bit cell with a Fourier or related transform. With this method of detection if two major frequency components occur, at F and ½ F the cell represents a data bit value of one. If only a single component is present at the lower frequency a cell data value of zero is decoded. The frequency components can be converted back to the time domain to accurately measure the distance between the points of interest.

With conventional magnetic stripe decoding there can be up to 14% variation in the ideal placement and actual detection of the bit-to-bit magnetic transitions. This variation along with the inability to sense an adjacent bit transition while writing data requires that conventional data writing write the complete track of information. When modifying data accurately measuring the placement is required to insure that the combined inaccuracies of the modified transitions and the initial placement is still within the 14% specification.

In U.S. Pat. No. 5,780,828 issued to Mos et al., there is described a method to selectively modify data without the requirement of writing a complete track of data. The method involves a two gap magnetic read head separated a know distance from a magnetic write gap. With the multiple read gaps separated by an odd multiple of bit transition spacing a write clock synchronized to the data can be generated.

SUMMARY OF THE INVENTION

This invention is a method and apparatus for reading and writing conventional ISO 7816 data with additional precisely placed pulses that appear as noise to conventional reading apparatuses and as data to the described invention using a combined spatial read/write head with a self-clocking data pattern, such as the Aiken code. In accordance with this invention, the velocity of the write head need not be constant with respect to the medium during the write operation. A write clock is generated by off setting two read heads by a known distance and using an integral write head to selectively modify the data.

Accordingly, a write clock can be generated from data, which is already present on the medium. Furthermore, by employing the split head spatial read/write head the data can be made secure from various sources of duplication including skimming. These observations are embodied in this invention as described below.

A number of embodiments of this invention have been described. Nevertheless, it will be understood that various modifications may be made without departing from the spirit and scope of the invention. Still further, it should be understood that while this invention is described in the context of a magnetic medium and magnetic read and write heads, this invention is applicable to any means for reading and writing data in which an Aiken code may be used. For example, such means might be bar codes written on paper, optically encoded data, etc. In yet another alternative embodiment of this invention, the read and write heads might move with respect to the medium. Accordingly, it is to be understood that the invention is not to be limited by the specific illustrated embodiments, but only by the spirit and scope of the appended claims.

Therefore, the principal object of the present invention is to provide a new and improved method of encoding data on a medium.

It is a further object of the present invention to provide a new and improved method of reading data on a medium.

It is further object of the present invention is to provide new and improved method of securely encoding data on a medium compatible with conventional readers for non secured data.

It is a further object of the present invention to provide new and improved method of securely encoding data on a medium incompatible with conventional readers.

It is a further object of the present invention to provide a combination of functions of the above invention to provide greater utility than the individual functions support.

It is a final object of the present invention to improve and expand the capabilities of the conventional apparatuses used for reading and writing ISO 7816 data.

Briefly, the value-added data access that is the subject matter of the instant invention as described herein more specifically addresses a method and apparatus for placing and later determining the distance between transitions from a first logical state to a second logical state stored on a medium, for example, a document. This determination is used to precisely characterize the information pattern in order to authenticate the information and the medium on which the information is stored. The invention uses a reader having a leading and trailing read apparatus, which allow information to be read simultaneously from two or more locations spaced a known distance apart. The distance between the center lines of each read apparatus is preferably an odd integer multiple of one half the distance between logical clock transitions. The distance between a first transition at the leading read apparatus and a next transition at the trailing read apparatus is used as a reference, hence given the term the "Reference Value". The Reference Value is compared with the distance between the first transition and a second transition on the medium. Detection of deviations in spacing between transitions is unaffected by variations in the velocity of the medium with respect to the reader.

Therefore, the present invention is a method and apparatus for reading and writing conventional ISO 7816 data with additional precisely placed pulses that appear as noise to conventional reading apparatuses and as data to the described invention. In addition the present invention applies to a medium, which moves at an uncontrolled velocity relative to a read/write apparatus with which the data is read and written.

BRIEF DESCRIPTION OF THE DRAWINGS

The above mentioned and other objects and features of this invention and the manner of attaining them will become apparent, and the invention itself will be best understood, by reference to the following description of the embodiment of the invention in conjunction with the accompanying drawings, wherein:

FIG. 6A is a timing diagram for the first alternate embodiment of this invention;

FIG. 6B is a illustration of the head structure for the first alternate embodiment of this invention;

FIG. 7A is an illustration of a divided track transducer for the third alternate embodiment of this invention;

FIG. 7B is an illustration of a magnet medium for the third alternate embodiment of this invention;

FIG. 8A is a graphic representation of the divided track transducer;

FIG. 8B is a graphic representation of a conventional transducer output for a magnetic medium encoded with a divided track transducer;

FIG. 13 is an illustration of the core construction of a "split gap" read/write apparatus. (head structure not core).

DESCRIPTION OF THE PREFERRED EMBODIMENTS

Throughout this description, the embodiment and examples shown should be considered as exemplars, rather than limitations on this invention.

Figure 1:
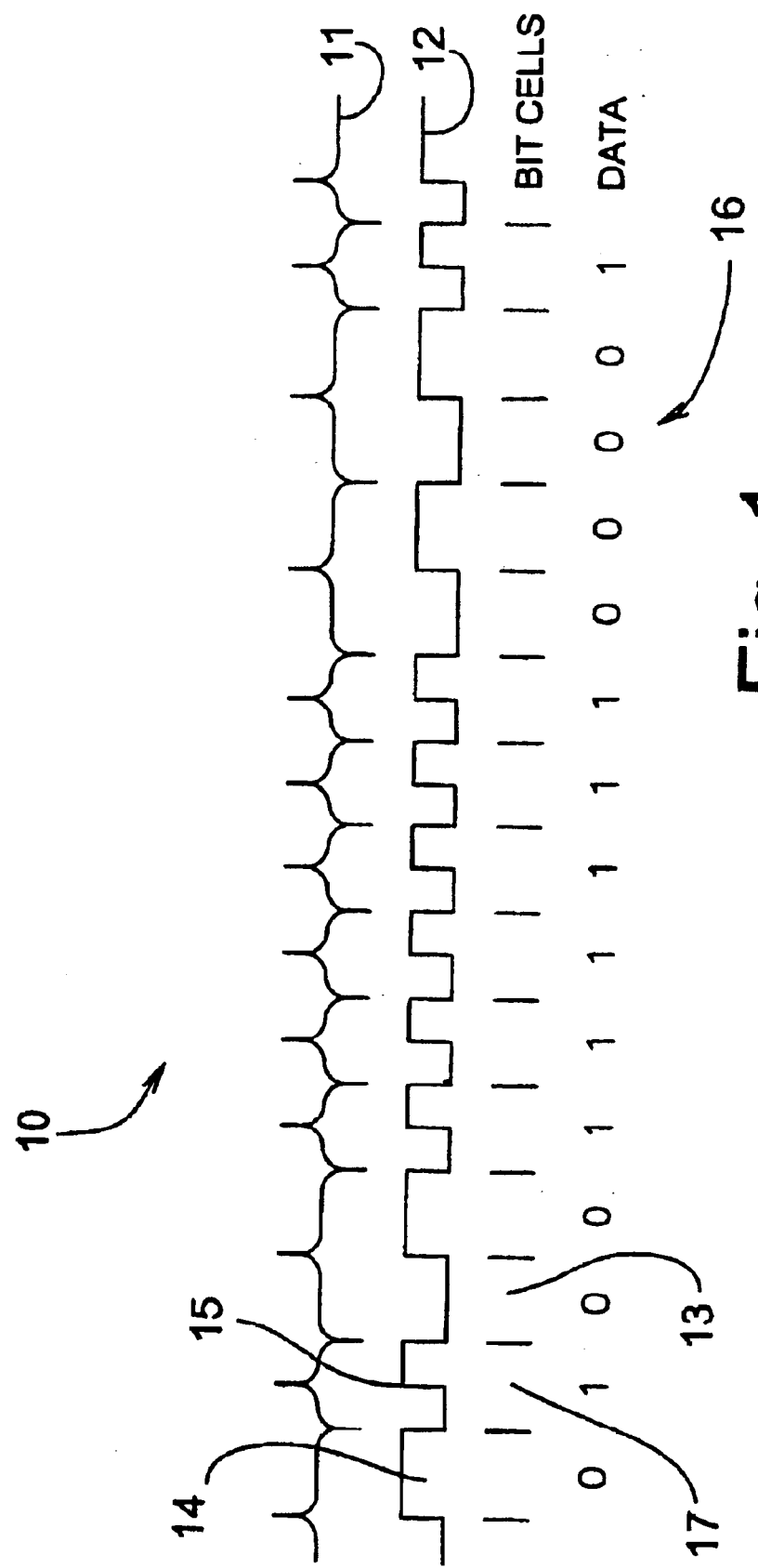
FIG. 1 is a prior art graphic representation of the voltage output from a read head, the output of the peak detector, the encoded data bit cell boundaries, and the decoded data for a magnetic medium.

Referring now to the figures, FIG. 1 is a prior art graphic representation of the voltage output from a read head 10, voltage waveform 11, the output of the peak detector 12, bit cell time (zero) 13, the data value of zero 14, the data value of one 15, the binary data stream 16 and the bit cell time (one) 17. The change in magnetic field states can be directly measured using a magnastritive (MR) head. Either voltage waveform 11 is converted to pulses using a peak detector (described below, see FIG. 3). The state generated are detected as pulse durations; one pulse duration is approximately double in length to the other. The longer pulse duration represents a bit cell time (zero) 13 and data value of zero 14, two consecutive pulses of the shorter duration also represent bit cells time (one) and data value of one 15 and in the aggregate a data bit value of zeros and ones, the binary bit stream 16.

Figure 2:
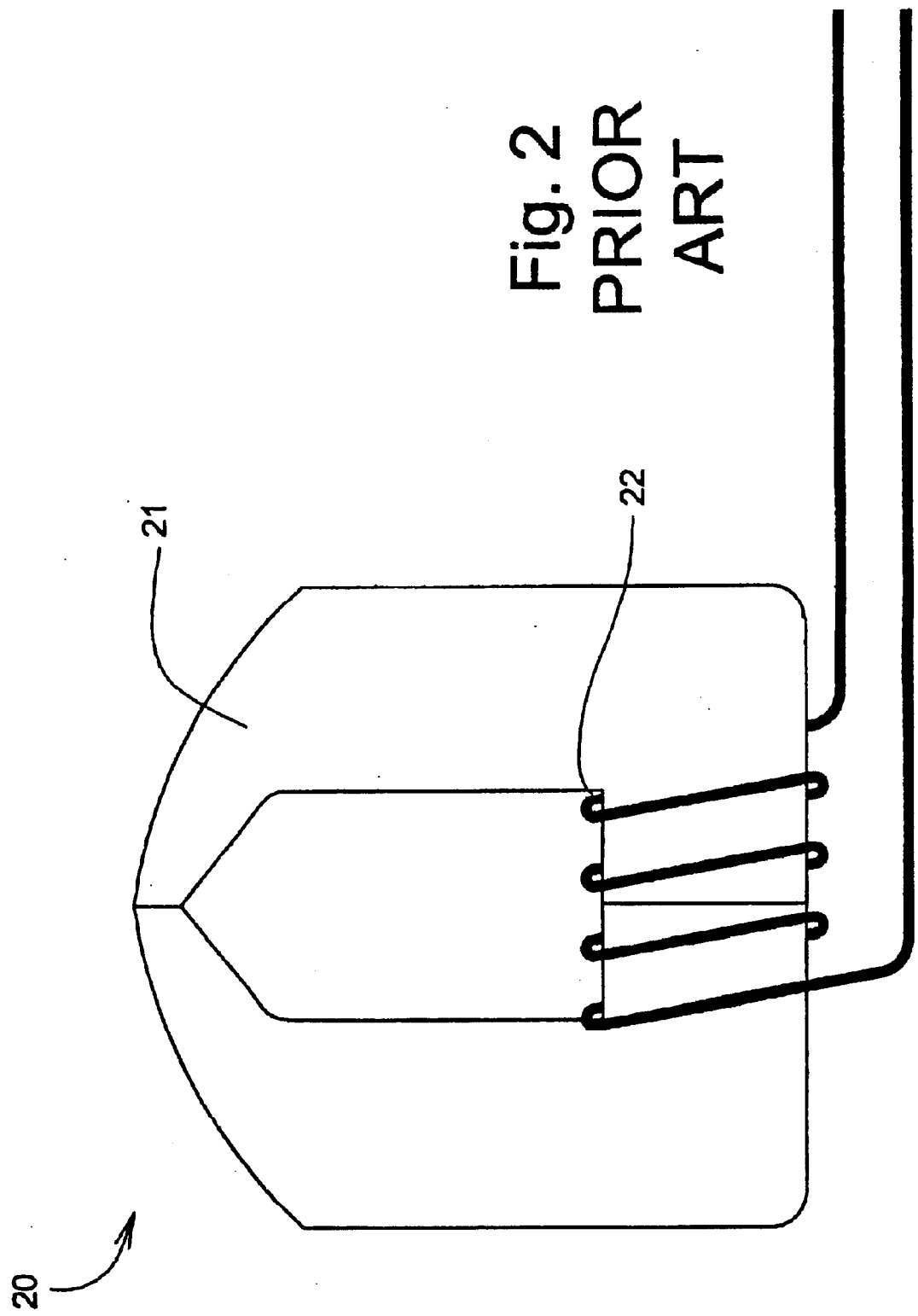
FIG. 2 is an illustration of the prior art magnetic head structure.

FIG. 2 is an illustration of the prior art magnetic head structure 20 comprised of a core head structure 21 and a head read/write coil 22. When magnetic medium is swiped across an inductive read head, such as magnetic head structure 20, the moving magnetic field induces a magnetic field in the head core structure 21 which in turn induces an electric current in the head read/write coil 22. When reading the data from the magnetic medium, transitions between the two magnetic field states induce a voltage in the magnetic head read/write coil 22.

Figure 3:
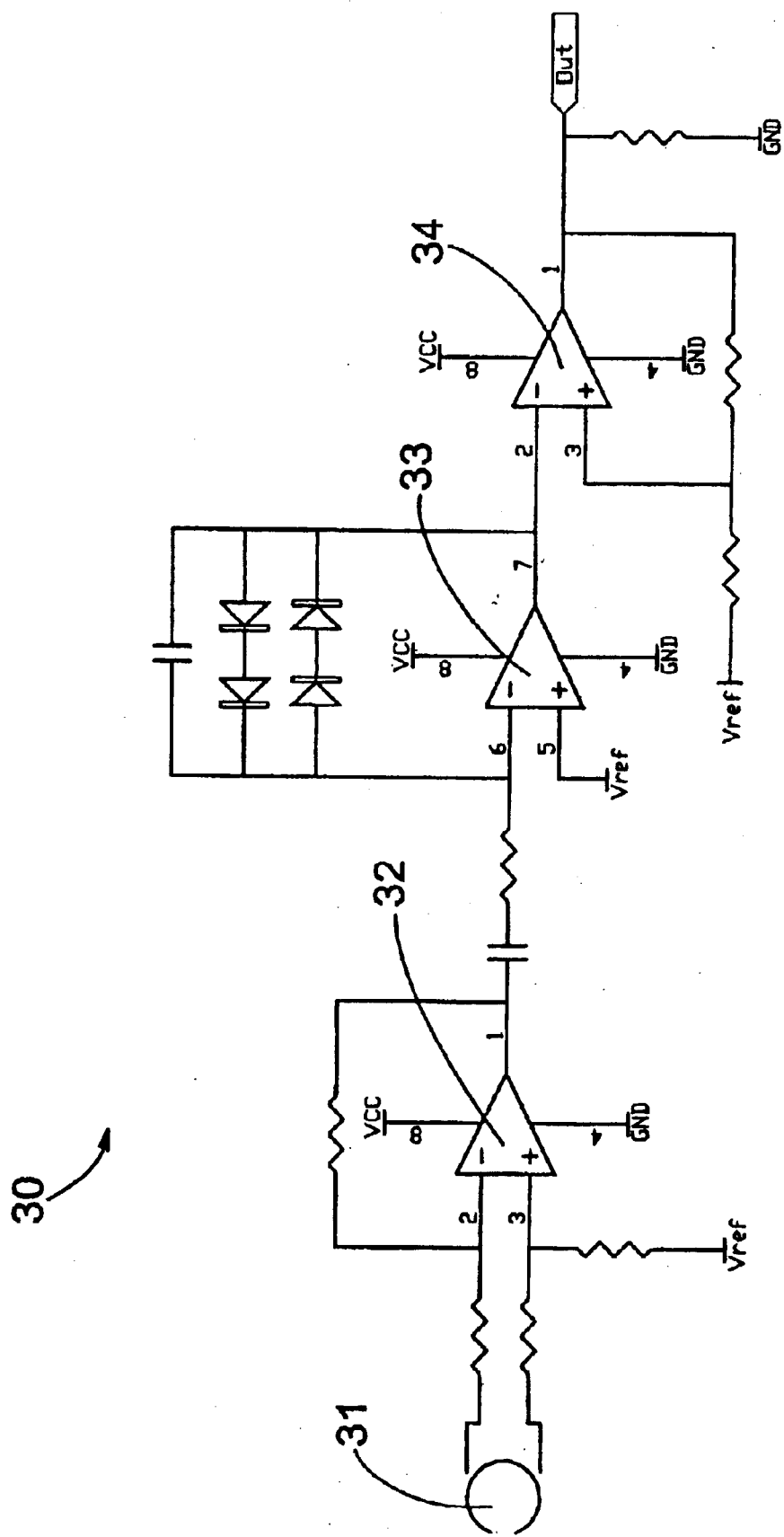
FIG. 3 is a schematic diagram of a read apparatus dual peak detector.

FIG. 3 is a schematic diagram of a conventional read apparatus dual peak detector 30 with a head coil voltage read apparatus 31, a differential amplifier 32, the dual edge peak detector 33 and a comparator/output buffer 34. The peak detector circuit 30 translates this voltage into binary states. The voltage from the head coil 31 is amplified by a differential amplifier 32 then a dual edge peak detector 33 switches between ground and VCC states each time the input changes polarity. The output of peak detector 30 is buffered by comparator 34 with hysteresis to improve noise immunity.

Figure 4:
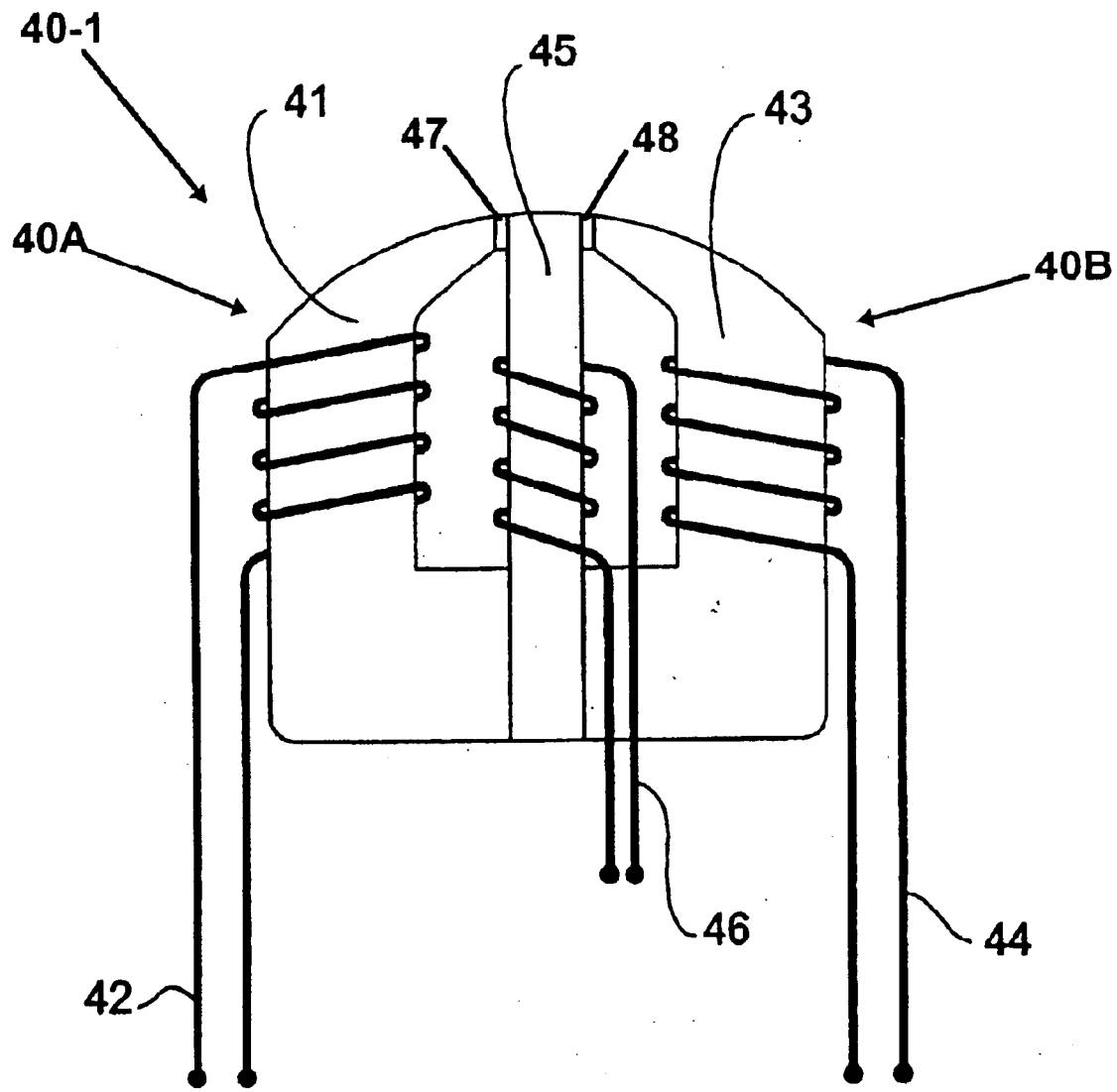
FIG. 4 is an illustration of the improved spatial read/write apparatus magnetic head.

Referring now to FIG. 4, in the preferred embodiment of this invention the improved special read/write magnetic head apparatus 40 comprises an unconventional spatial read head where two read/write head magnetic components 40A and 40B, read head structure 41, read head structure 43, read coil 42 and read coil 44 share a common center return bar 45, in which the centers return bar 45 is also a write head with center write coil 46. The first read/write head magnetic component 40A is spaced apart from the center return bar 45 by the leading read/write gap 47 and the second read/write head magnetic component 40B is spaced apart from the center return bar 45 by the trailing read/write gap 48 and each are set in one embodiment to a multiple of three quarters of a bit cell.

Figure 5:
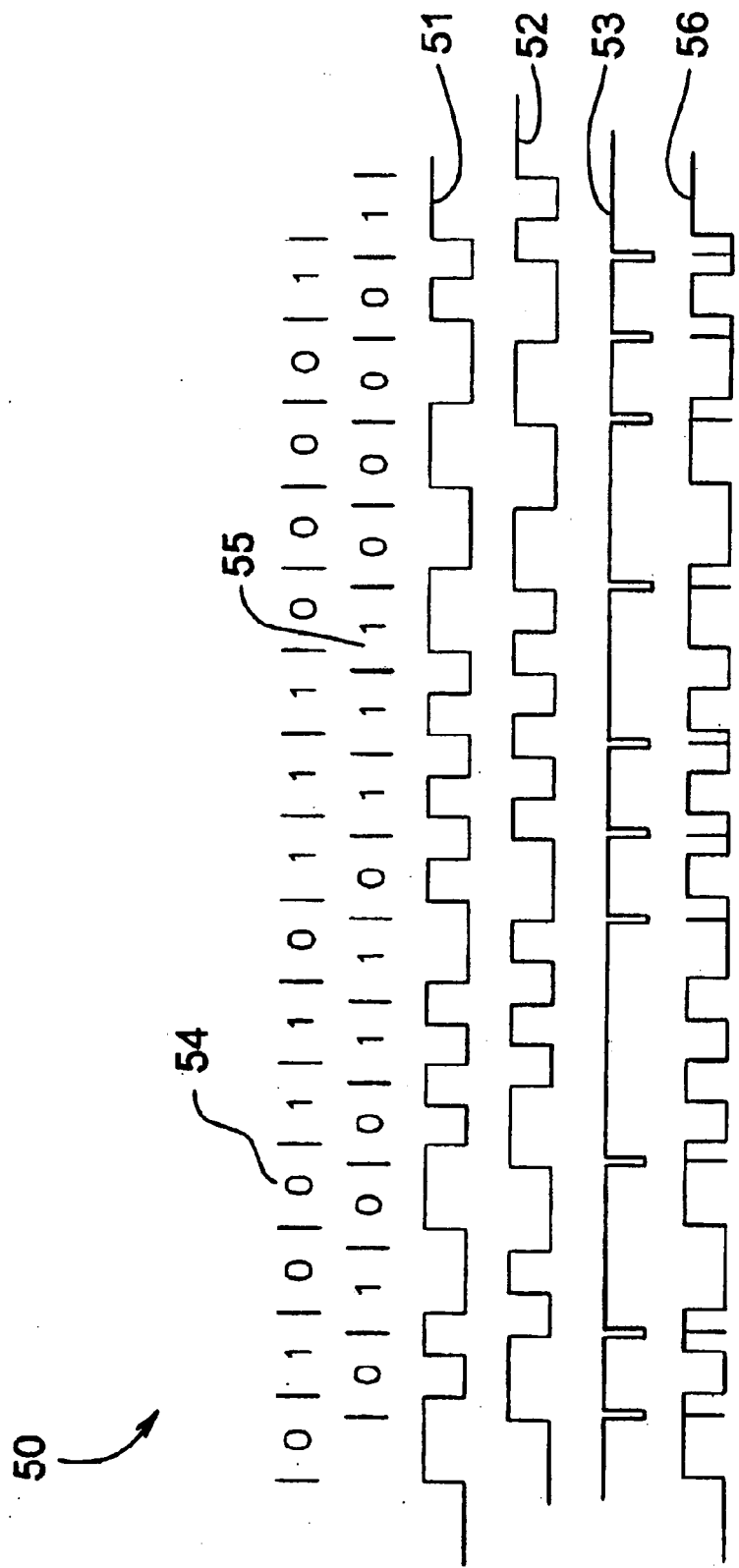
FIG. 5 is a graphic representation of the timing waveforms for fourth embodiment of this invention.

The two read/write head magnetite components 40A and 40B read preexisting data from the medium offset by the multiple of three quarters of a bit cells indicated by the preexisting data bit cell read 51 and 52 illustrated in FIG. 5. The write circuit generates a fast pulse write clock which is used to selectively write a pulse at the ¾ wavelength point as in the fast pulse write clock bit times 53 relative to the first or pre-existing data bit cell read 51. The read cell bit times are shown in FIG. 5 as the leading head read cell bit times 54, and the trailing head read cell bit times 55. The write pulse creates a short transition at the point of the bit cell that is normally ignored by read apparatuses since it is not at a valid bit position.

In addition since the write head is only pulsed, no transition is created in the bit cell. Using the same improved special read/write magnetic head apparatus 40, the pulse data can be recovered while the recovered data/existing data combined 56 is read. Due to the shortness of the pulse, conventional readers will not detect the pulse or if they do, they will discard the pulse as noise.

This improved special read/write magnetic head apparatus 40 can also be used to record conventional data. In this application, the leading read/write head magnetic components 40A is used with a motorized or optical transport or cross track clock generation, (see U.S. Pat. No. 5,780,828 issued to Mos et al.) to generate the initial bit cell spacing information, which is similar to formatting other magnetic media. During format and conventional write operations the leading read/write gap 47 will write bit cell transition data that will be overwritten by the trailing read/write head magnetic component 40B with a transition of the opposite polarity. Since the two read/write gaps 47 and 48 share a common center core each writes with an opposite polarity. In over-writing old data all transitions require the media to go though a polarity or state change. This allows the data to be placed with less variables and thus with greater accuracy.

In accordance with a first alternate embodiment of this special read/write magnetic head apparatus 60, there is illustrated in FIG. 6A, how the magnetic encoded data 61 is converted to a voltage waveform 62 in the head structure and timing diagram 60 in FIG. 6B. This device uses conventional spatial read/write heads where a read/write head magnetic component 60A comprising a trailing head coil 63, and a trailing head structure 67 and where a read/write head magnetic component 60-B comprises a leading head coil 64, and a leading head structure 68, further comprising a trailing head read/write gap 65 and the leading head read/write gap 66.

The trailing head read/write gap 65 and the leading head read/write gap 66 share a common center return bar 69 with a center write coil 69A, having the trailing head read/write gap 65 and the leading head read/write gap 66 spacing as an odd multiple of one half bit cell. This embodiment optionally allows a special read/write magnetic head apparatus 60 to be used to write conventional data as in the previous embodiment.

In addition to decoding data the spatial read/write head can be used to measure the distance between transitions close to the spacing of the gaps. This spacing information can be used in security applications to prevent card modification and duplication. (see Mos et al. U.S. Pat. No. 5,770,846 and Mos et al. U.S. Pat. No. 6,260,146 B1). Since this embodiment can measure the distance over multiple transitions in the trailing head ready/write gap 65 and the leading head read/write gap 66, the measurement is not jitter, which is the bit-to-bit variation in transition placement.

In accordance with a second alternate embodiment of this special read/write magnetic head apparatus as shown in FIG. 6A, the magnetic encoded data 61 is converted to a voltage waveform 62 illustrated in FIG. 6B, using a conventional spatial read head where a read/write head magnetic component 60A comprising trailing head coil 63, and trailing head structure 67 and leading head coil 64, and leading head structure 68, with trailing head read/write gap 65 and the leading head read/write gap 66, sharing a common center return bar 69 with center write coil 69 in which the center return bar 69 may also be used as a write head with two return bars comprised of the two read/write heads magnetic components 60-A and 60-B with the gaps between the heads being a known distance.

The distance in one case is chosen to be close to an odd multiple of one half a bit cell. With the distance slightly less than the odd multiple described in first alternate embodiment the transition-to-transition spacing measurement always generates a positive number, which has advantage in many systems. In addition the special read/write magnetic head apparatus as shown in FIG. 6A can be used with a short pulse as described in the preferred embodiment. In this case a short pulse is placed adjacent to a data transition. A similarly constructed head can detect this pulse, while a conventional read device will not detect the pulse.

In accordance with a third alternate embodiment of this special read/write magnetic head apparatus as shown in FIG. 7A, the magnetic encoded data 61 is converted to a voltage waveform 62 as shown in FIG. 6 using a divided track transducer head 70 illustrated in FIG. 7A. With this device a read/write head magnetic component 70-A consisting of trailing head coil 76, and trailing head structure 73 and read/write head magnetic component 70-B consisting of leading head coil 77, and leading head structure 74, with trailing head read/write gap 75 and the leading head read/ write gap 78, share a common center return bar 79, as similarly described in the improved special read/write magnetic head apparatus 40. In addition the head core is composed of laminations that are constructed of materials that are both ferrous and non-ferrous further illustrated in FIG. 13.

Figure 10:
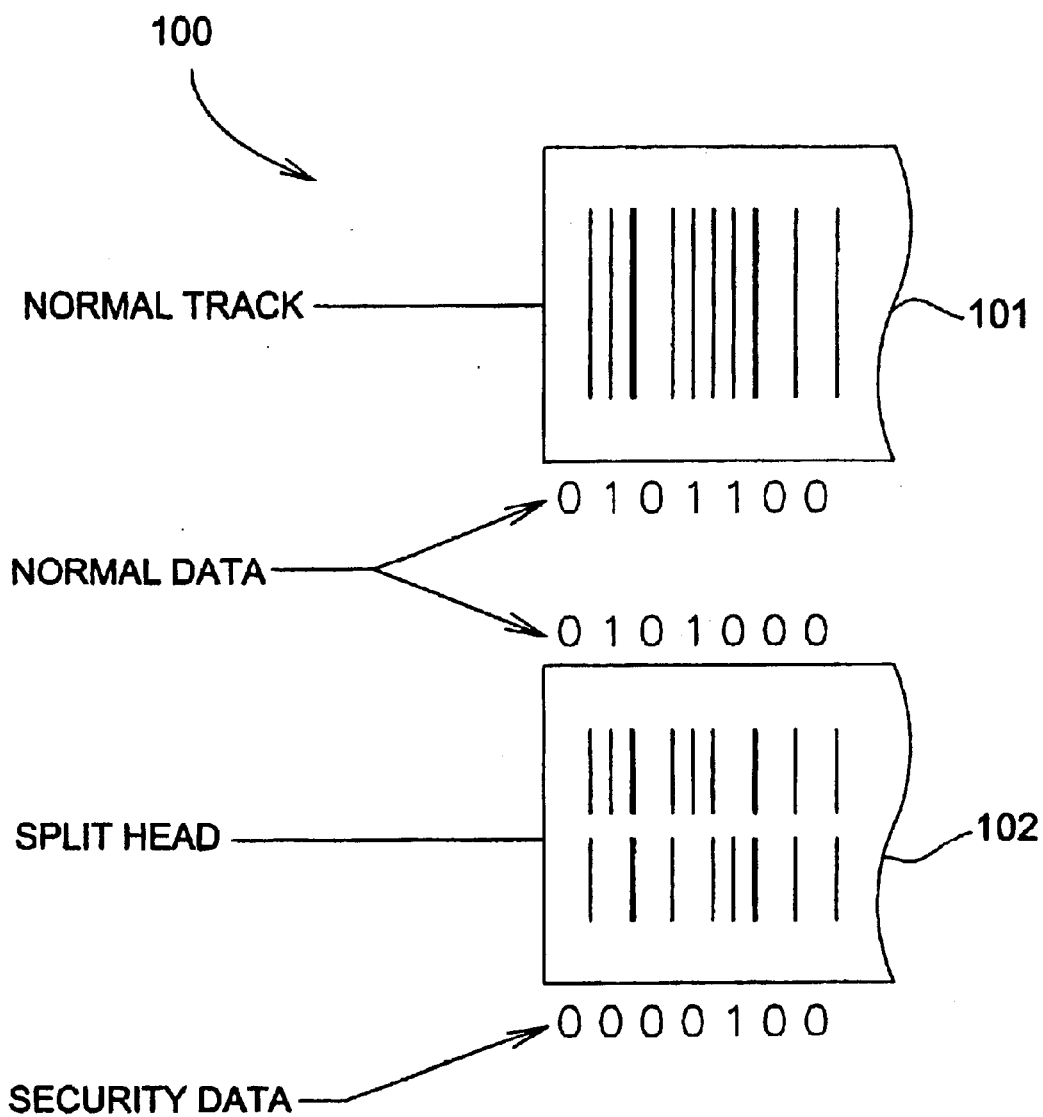
FIG. 10 is an illustration of a comparison of a conventional encoded data on the magnetic medium to the split head apparatus described in this invention.

The effect is to allow the leading head read/write gap 78-A to write leading head read/write gap data 78-B as illustrated in FIG. 7B on the magnetic medium 71 over a portion of the track 72-A and the trailing head read/write gap 75-A to write trailing head read/write gap data 75-B over a different portion of the track 72-B. Conventional data is further illustrated in FIG. 10 where a magnetic medium 101 carrying normal track data is compared with a magnetic medium carrying 102 carrying split head data. Using spatial read/write magnetic head apparatus as shown in FIG. 7A causes data transitions to be comprised of multiple transition segments separated by the spacing of the read/write head gaps 75-B and 78-B in the axis of the data.

During a subsequent read operation illustrated in FIGS. 8A and 8B, FIG. 8A displays a similar split head structure 81 where the leading and trailing read apparatus outputs 82, 83 and 84 are synchronized with each other allowing the data to be recovered. Since the data transitions illustrated in FIG. 8B are offset and made up of two or more segments a conventional read apparatus or "skimmer" using conventional heads 85, will detect data 86, 87 and 88 as garbled and unreadable. This embodiment, read/write magnetic head apparatus as shown in FIG. 7A addresses the problem of skimming as discussed above.

Figure 9:
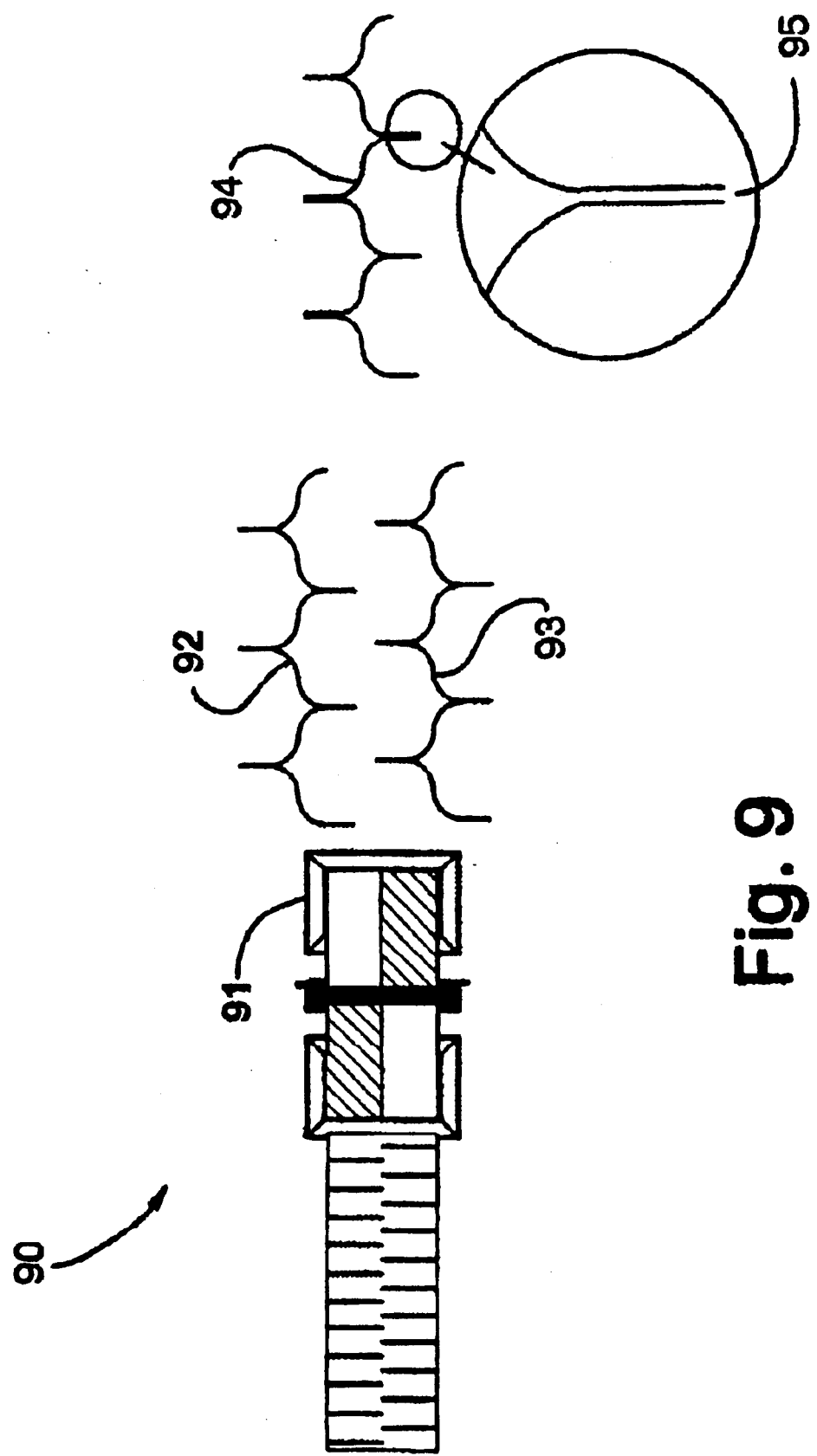
FIG. 9 is a graphic representation of the output waveform for the embodiments.

FIG. 9 illustrates the third alternate embodiment, spatial read/write magnetic head apparatus as shown in FIG. A, in which the spatial variations from each of the read heads are used to verify the data authenticity. Since the split head writes two of more transitions simultaneously offset in both the X and Y split head write data waveform directions 92, 93 and 94, and since various variations in the magnetic recording process such as material and head spacing cause the recorded transitions to vary in placement from the ideal 95, (see Mos et al. U.S. Pat. No. 5,770,846 and Mos et al. U.S. Pat. No. 6,260,146 B1), the deviation from coincidence on read data from the multiple read heads can be used to generate a signature for the data that can be used to verify that the card is the original and not a copy.

In accordance with the third alternate embodiment, special read/write magnetic head apparatus as shown in FIG. 7A, if the Precision Peak Detector is replaced with a Digital Signal Processor capable of performing the function of the Precision Peak Detector, performing a Fourier transform on each bit cell, the frequency can be ascertained directly from the digitized analog data without the need of peak detection. The frequency data can be used to decode the data and the frequency deviation between the multiple read heads can be used to generate the signature information. The signature information from the split head of the third alternate embodiment of the special read/write magnetic head apparatus as shown in FIG. 7A is added to the previously recorded data of the same or alternate track using any of the spatial write pulse techniques described.

Multiple track heads may be constructed from variations of the heads described in the previous embodiments with each track being used to address a different requirement for a given system.

Figure 11:
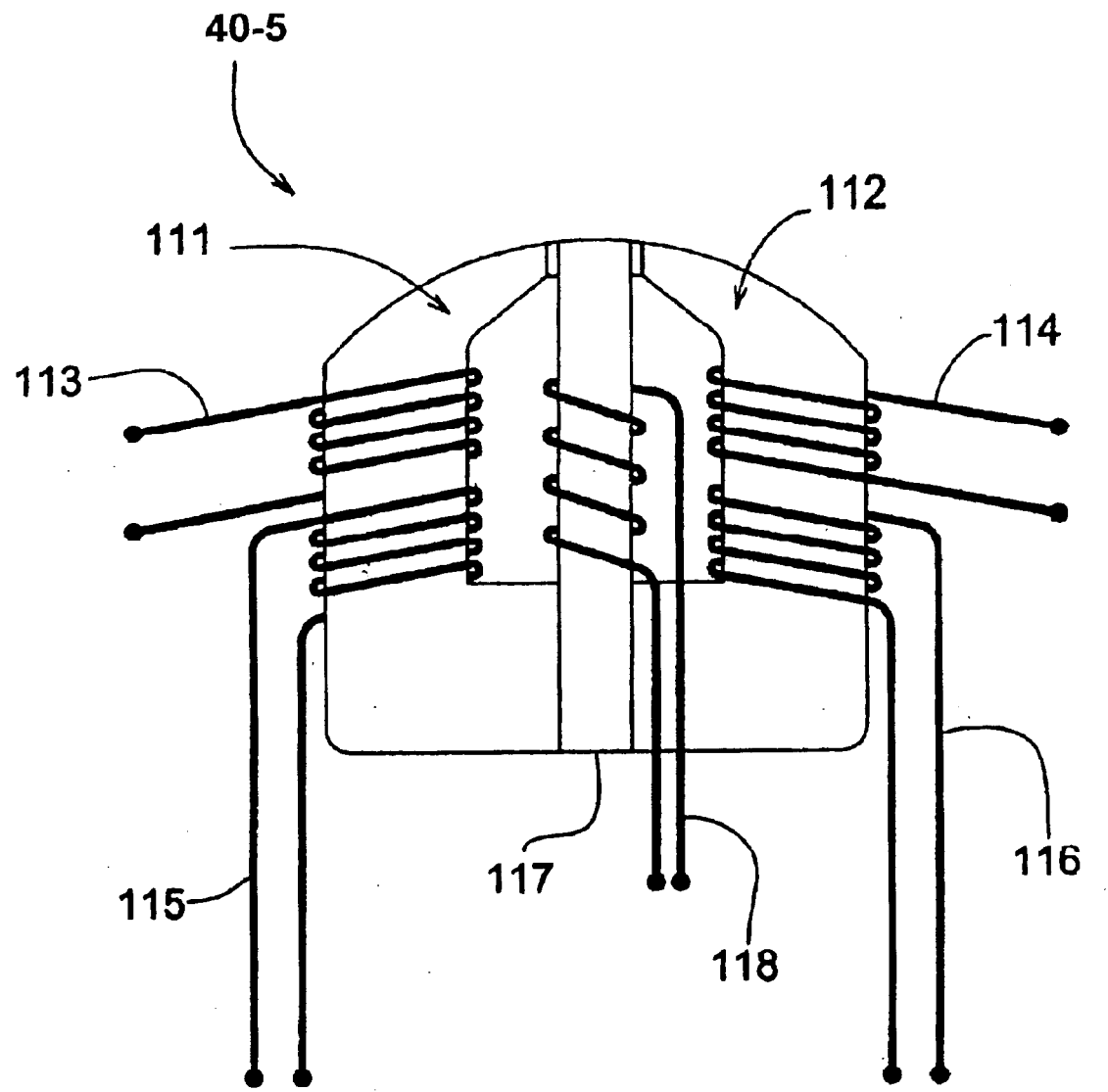
FIG. 11 is an illustration of the embodiment of the invention.

In accordance with a fourth alternate embodiment of this invention, in a split track spatial read/write head 40-5 one or both of the read head coils 115 and 116 are augmented with secondary write coils 113 and 114 illustrated in FIG. 11. This allows for a bucking voltage to be applied selectively to either core, which lowers the magnetic field strength to a level below that which is required to affect the magnetic domains on the media allowing each ½ track of data to be independently controlled. In addition to increasing the amount of data that can be stored on the track the data can be configured so that a conventional reader can decode standard ISO data and a reader using the split track spatial read/write head 40-5 can decode both ISO data and additional data to be used for security or other applications.

In accordance with the fifth alternate embodiment of this inventions a split track spatial read/write head 40-6 will have the addition of a secure semiconductor device 141 mounted on the terminal board 143 illustrated in FIG. 14 to provide for security against tampering including and not limited to a serial number, manufacturing test parameters such as actual gap spacing, a temperature sensor, an encryption engine for secure communication with a controller, and a serial communication controller for communicating with a host controller. One or more of the above functions may be combined into a single integrated circuit 142.

Figures 12A, 12B:
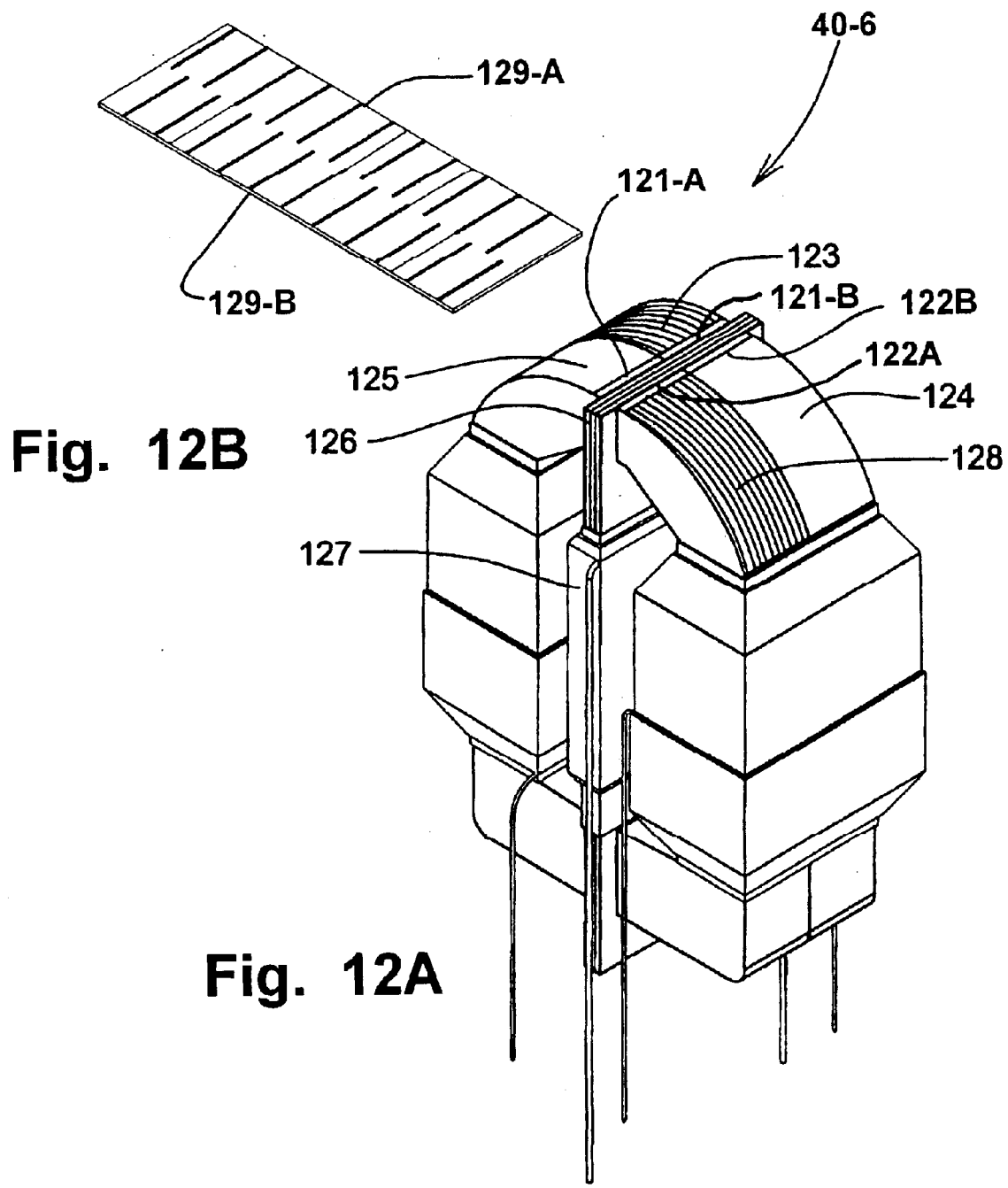
FIG. 12 is an illustration of a "split gap" read/write apparatus.
Figure 14B:
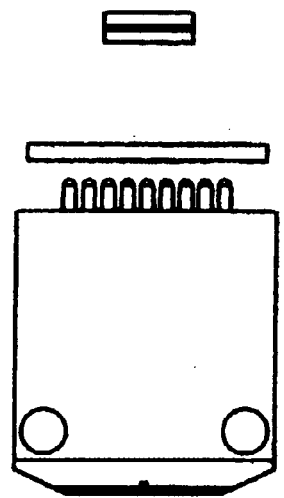
FIG. 14B is an illustration of a front perspective exploded view of a secure split track read/write head structure having a integrated circuit mounting and termination board and an integrated circuit for attachment thereto.
Figure 14D:
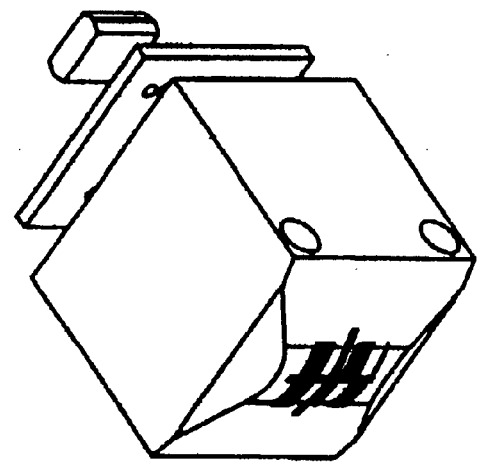
FIG. 14D is an illustration of a plan exploded view of a secure split track read/write head structure having a integrated circuit mounting and termination board and an integrated circuit for attachment thereto.
Figure 14A:
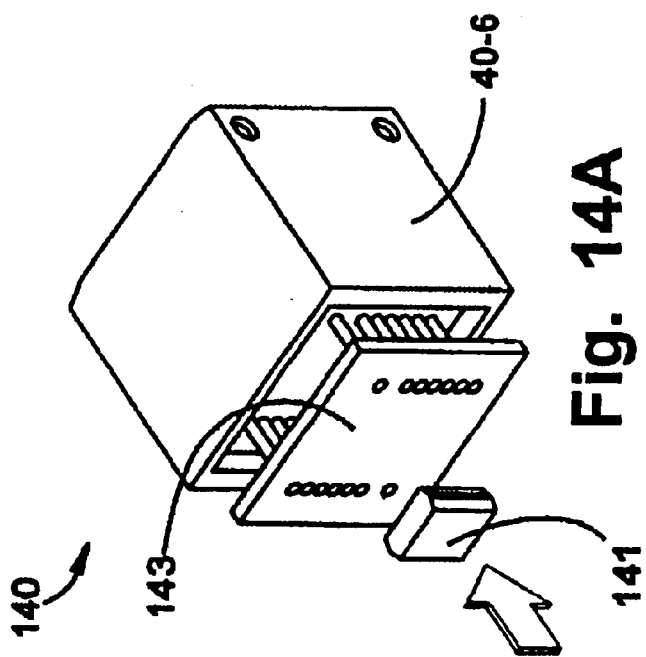
FIG. 14A is an illustration of a rear perspective exploded view of a secure split track read/write head structure having a integrated circuit mounting and termination board and an integrated circuit for attachment thereto.
Figure 14C:
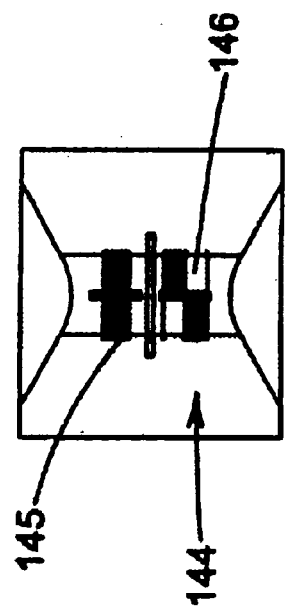
FIG. 14C is an illustration of a front elevational view of a secure split track read/write head structure having both a spacial read/write head and a split track read write head.

FIG. 12 is an illustration of the fifth alternate embodiment of this invention, a split track spatial read/write head 40-6 comprising ferrous and non-ferrous structures displaying the relative locations of two read/write gaps 121-A and 121-B and two read/write gaps 122-A and 122-B formed within a read/write apparatus in accordance with one of the embodiments of this invention. As is well known in the art of reading and writing data on a magnetic medium, a magnetic field is generated across a gap in the magnetic core material of a write head.

The magnetic field is typically generated by applying a current through write coil 127 wound around the magnetic center return bar 126. In this case the write core material is the center return bar126 of the split track spatial read/write head 40-6. The core made of non-ferrous material 124 and the core made of ferrous material 125 which also form the read head structure complete the magnetic path for the write circuit. The field that is generated is sufficiently strong to polarize magnetically sensitive particles at the surface of a magnetic medium over which both gaps of the write head passes. When a read head passes over the magnetically polarized particles of the medium, changes (commonly referred to as "transitions") in the magnetic field generate a current in a coil wound around a magnetic core material of the read head.

In accordance with the fifth embodiment of this invention, two such read/write gaps 121-A, 121-B and two such read/write gaps 122-A, 122-B illustrated in FIG. 12 are provided. The spacing between the longitudinal center lines of the read/write gaps 121-A, 121-B, 122-A and 122-B is preferably a known distance. In addition the cores 123 and 128 are comprised of a stack of both ferrous and non-ferrous materials 132, 133 and 136 to create the split gap effect further illustrated in FIGS. 13A, 13B and 13C. Non-ferrous cores 131,134 and 135 are also depicted in the split gap core construction 130 shown in FIGS. 13A, 13B and 13C.

Bit cells 13 depicted in FIG. 1, prior art, are defined as the predetermined distance between clock transitions, when the data is written in a particular self-clocking code, such as Aiken code, in which a data transition occurring halfway between such clock transitions indicates a first logic state 17, and in which no transitions occurring between clock transitions 13 indicates a second logic state.

It should be noted that the waveforms 51, 52 shown in FIG. 5 are not the waveforms that are directly output from the read heads, but rather are those waveforms which appear at the output of a wave shaping circuit in FIG. 3 which causes a square wave to be output. The output has transitions from a high state to a low state or from a low state to a high state occurring each time a read head detects a transition from one polarity to the other.

In the present description with relation to the graphic representation in FIG. 5, the read heads generating outputs 51, 53 are assumed to include all necessary circuitry to output such signals, including amplifiers and wave shaping circuitry. The output 51 is from the leading read head, which includes the read/write gap 121, and the output 52 is from the trailing read head, which includes read/write gaps 122-A and 122-B. It can be seen that the data is written as two distinct transitions 121-A and 121-B shown in FIG. 12B separated by the spacing of the read/write gaps 126-A and 126-B. It can also be seen that since both transitions are written by the same write current that the spacing of the correspondingly written pulse is controlled by the spacing of the gaps and the variations in the magnetic characteristics of the medium.

During subsequent reading of these transitions the timing differences 95 depicted in FIG. 9, can be used to generate a signature based on deviation from ideal transition placement, which is then stored to verify the authenticity of the data. Other systems which uses spacing deviations of the magnetic transitions to secure data are hampered by either or both the timing inaccuracies caused by the read or write mechanism. This is caused by the need to move the medium from the position of the first to second transition.

In a sixth alternate embodiment of this invention, the spacing between the longitudinal center lines of the read/write gaps 121-A, 121-B, 122-A and 122-B is preferably an odd multiple of one half the bit cell distance (e.g., ½, 1½, 2½ . . . ). In addition to the center return bar 117 each read/write head magnetic component 111 and 112 also includes a write coil 115,116 illustrated in FIG. 11.

By selectively enabling a bucking current at either read/write head magnetic component 111 and 112 the magnetic strength though that path can be reduced to below the level required to cause a magnetic transition to be written. As in the previous embodiment data is written and a security signature is written. In addition the data is selectively modified using bucking coils to include the security signature with the secure data.

It should be understood, however, that even though these numerous characteristics and advantages of the invention have been set forth in the foregoing description, together with details of the structure and function of the invention, the disclosure is illustrative only, and changes may be made in detail, especially in matters of shape, size, interactivity and arrangement of components within the principal of the invention to the full extent indicated by the broad general meaning of the terms in which the appended claims are expressed.

What is claimed is:

1. A device for secure read write, and read/modify/write operations comprising:
   a first read head;
   a second read head;
   a return bar, common to both said first and second read heads, wherein said first read head and second read head are spaced apart by said common return bar;
   wherein said common return bar is part of the same magnetic structure as said first and said second read heads and is employed as a writer head common to both said first and second read heads;
   means for generating data variables for future use; and
   means for storing said data variables in a memory for future use.

2. The device for secure read, write, and read/modify/write operations according to claim 1, wherein said cores of the first read head and of the second read are each constructed using a layer of ferrous material and a layer of non-ferrous material.

3. The device for secure read, write, and read/modify/write operations according to claim 1, further comprising:
   means for generating an electronically readable serial number for future use; and
   means for storing said electronically readable serial number in a memory for future use.

4. The device for secure read, write, and read/modify/write operations according to claim 1, further comprising one or more microprocessors containing stored data, for the purpose of secure transmission of said stored data.

5. The device for secure read, write, and read/modify/write operations according to claim 4, wherein said one or more microprocessors provide for encryption of the stored data, for the purpose of secure transmission of said encrypted stored data.

6. The device for secure read, write, and read/modify/write operations according to claim 5, wherein said device further includes a temperature sensor for monitoring operation of the device within a predetermined temperature range.

7. The device for secure read, write, and read/modify/write operations according to claim 1, wherein said first read head is spaced apart from said second read head by a multiple of ¾ wavelength of a bit cell.

8. The device for secure read, write, and read/modify/write operations according to claim 7, wherein said common return bar being employed as a write head, is used to place a short pulse on read media at a multiple of ¾ wavelength of a bit cell, and said first or second read heads are employed to detect said short pulse at a multiple of ¾ wavelength of a bit cell, whereby said short pulse detection is used to increase the amount of data stored on read media.

9. The device for secure read, write, and read/modify/write operations according to claim 8, wherein said device further includes one or more microprocessors containing stored data, for the purpose of secure transmission of said stored data.

10. The device for secure read, write, and read/modify/write operations according to claim 9, wherein said short pulse is used to verify the authenticity of the data.

11. The device for secure read, write, and read/modify/write operations according to claim 1, wherein said first read head is spaced apart from said second read head by a multiple of ½ wavelength of a bit cell.

12. The device for secure read, write, and read/modify/write operations according to claim 11, wherein said common return bar being employed as a write head, is used to place a short pulse on read media at a multiple of ½ wavelength of a bit cell, and said first or second read heads are employed to detect said short pulse at a multiple of ½ wavelength of a bit cell, whereby said short pulse detection is used to increase the amount of data stored on read media.

13. The device for secure read, write, and read/modify/write operations according to claim 12, wherein said device further includes one or more microprocessors containing stored data, for the purpose of secure transmission of said stored data.

14. The device for secure read, write, and read/modify/write operations according to claim 13, wherein said short pulse is used to verify the authenticity of the data.

15. A device for secure read, write, and read/modify/write operations comprising:
   a first read head;
   a second read head, wherein each read head acts as a leading read head or a trailing read head depending upon the direction of the media being read;

a return bar, common to the first read head and the second read heads and having a first end spaced apart from the first and from the second read heads and a second end joined to the first and second read heads, the return bar being part of the same magnetic structure as the first and the second read heads; and means for recording and for comparing data, wherein a coincidence of read data is generated from said leading and trailing heads at random locations within the data recorded, said coincidence of read data is stored, and during a subsequent read operation a newly generated coincidence of read data is compared to said stored coincidence of read data for the purpose of verifying that the read data is not a forgery.

16. The device for secure read, write, and read/modify/write operations according to claim 15, wherein said first read head is spaced apart from said second read head by a multiple of ¾ wavelength of a bit cell.

17. The device for secure read, write, and read/modify/write operations according to claim 15, wherein the spacing between said first read head and said second read head is made slightly more or less than a multiple of ¾ wavelength of a bit cell, for the purpose of generating a positive or negative deviation for the bit spacing.

18. The device for secure read, write, and read/modify/write operations according to claim 15, wherein said first read head is spaced apart from said second read head by a multiple of ½ wavelength of a bit cell.

19. The device for secure read, write, and read/modify/write operations according to claim 15, wherein the spacing between said first read head and said second read head is made slightly more or less than a multiple of ½ wavelength of a bit cell, for the purpose of generating a positive or negative deviation for the bit spacing.

20. The device for secure read, write, and read/modify/write operations according to claim 2, wherein one layer of said ferrous material in one read head is aligned with one layer of non-ferrous material in the other read head, and wherein the core of the return bar is composed of ferrous material and acts as a write head common to both read heads.

21. A method for secure reading, writing, and reading/writing/modifying operations on magnetic media, comprising the steps of:

(a) encoding data onto the magnetic media using a first read head, a second read head and a write head that are separated by shared read/write gaps and that are part of the same magnetic structure; and (b) encoding offset transitions onto the magnetic media;

(c) storing information characterizing said offset transitions;

(d) reading the encoded data in (a) and detecting the presence of absence of said offset transitions stored;

(e) comparing the encoded data with the presence or absence of the offset transitions as detected in (d); and (f) using the comparison to verify the authenticity of the read data on the magnetic media.

22. The method for securing reading, writing, and reading/writing/modifying operations in a data document according to claim 21, further comprising the steps of:

(a) using a first read head, a second read head and a common return bar acting as a write head to accurately measure the exact placement information of said encoded transitions;

(b) storing said exact placement information of said encoded transitions along with the presence or absence of said offset transitions; and (c) comparing the exact placement of said transitions with the stored placement of said offset transitions during a subsequent read operation.

23. The method for secure reading, writing, and reading/writing/modifying operations in a data document according to claim 21, wherein the transitions are altered by encoding short pulses onto the magnetic media at about a ½ bit wavelength.

24. The method for secure reading, writing, and reading/writing/modifying operations according to claim 21, wherein the encoded data are altered by encoding offset transitions onto the magnetic media at approximately a ¾ bit wavelength.

25. A method for writing secure data on a magnetic medium and verifying the authenticity of a data document, comprising the steps of:

(a) encoding data onto magnetic media using a divided track transducer head having a first read head, a second read head and a write head that are separated by shared read/write gaps and that are part of the same magnetic structure; and (b) encoding short pulses using said divided track transducer head;

(c) storing information generated by the encoding of said offset transitions;

(d) reading said encoded data and detecting the presence or absence of said offset transitions information previously stored;

(e) comparing the short pulses encoded in step (b) and the presence or absence of offset transitions information as detected if step (d); and (f) using said comparison of said encoded offset transitions and the subsequently read offset transitions data to verify the authenticity of the data document.

26. The method for writing secure data on a magnetic medium data document and verifying the authenticity of a data document, according to claim 25, wherein the short pulses are encoded close to the ½ bit wavelength.

27. The method for writing secure data on a magnetic medium and verifying the authenticity of a data document, according to claim 26 wherein said step of storing information generated by the encoding of said offset transitions further includes storing the exact placement information for said offset transitions encoded.

28. The method for writing secure data on a magnetic medium and verifying the authenticity of a data document, according to claim 27 wherein said exact placement information for said offset transitions is compared with the exact placement of offset transitions in a subsequent read operation.

29. The method for writing secure data on a magnetic medium and verifying the authenticity of a data document, according to claim 25 wherein said step of storing information generated by the encoding of said offset transitions further includes storing the exact placement information for said offset transitions encoded.

30. The method for writing secure data on a magnetic medium and verifying the authenticity of a data document, according to claim 24 wherein said exact placement information for said offset transitions is compared with the exact placement of offset transitions in a subsequent read operation.

31. The method for writing secure data on a magnetic medium data document and verifying the authenticity of a data document, according to claim 25, wherein the short pulses are created close to the ¾ bit wavelength.

* * * * *